United States Patent Office 2,774,653
Patented Dec. 18, 1956

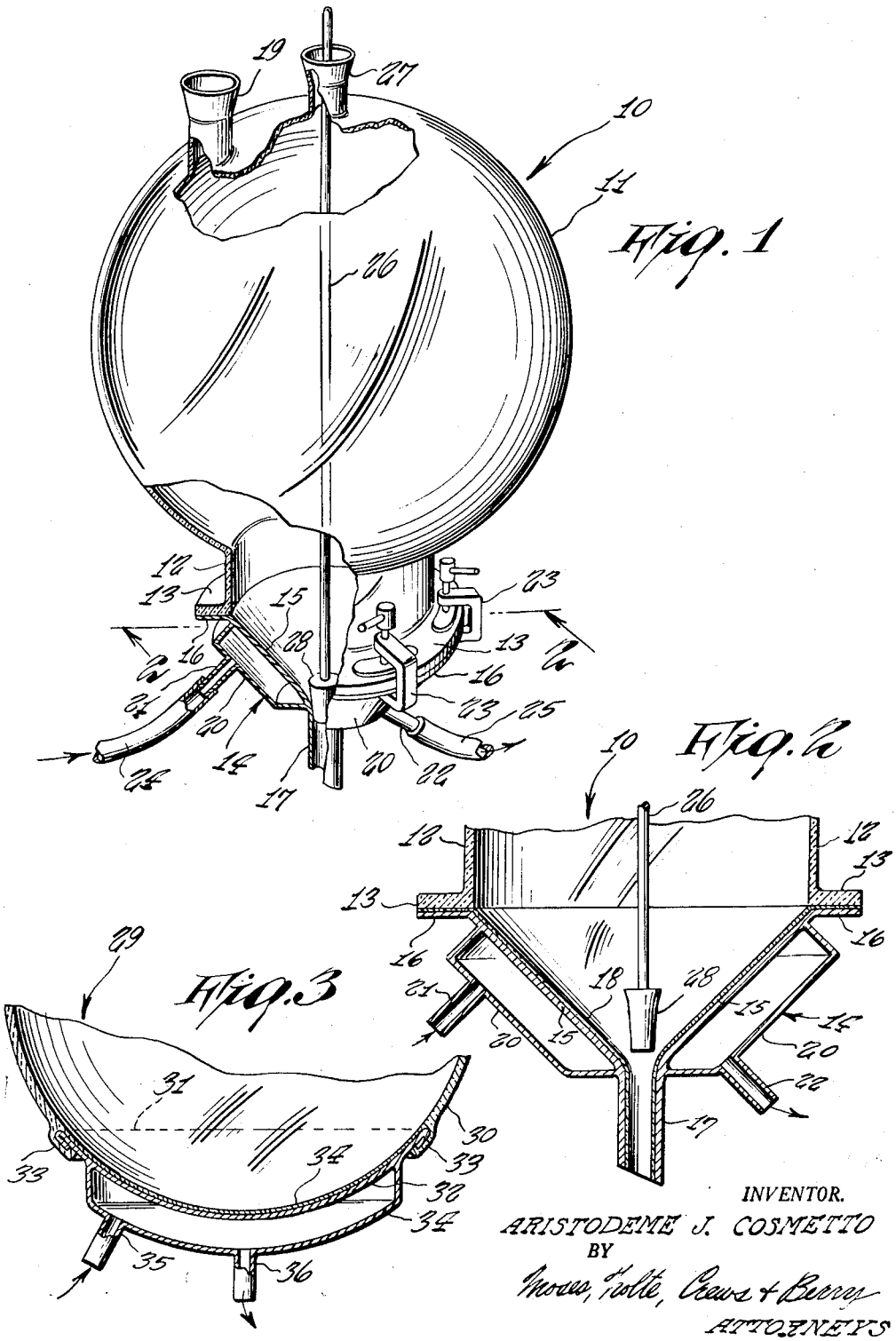

2,774,653

CHEMICAL APPARATUS FOR REACTING CHEMICALS REQUIRING HEAT TRANSFER

Aristodeme J. Cosmetto, Rye, N. Y.

Application March 26, 1953, Serial No. 344,863

3 Claims. (Cl. 23—259)

This invention relates to chemical apparatus and more particularly to types of apparatus in which a chemical reaction takes place during heating or cooling.

In the laboratory, various means are employed for heating reaction vessels in which chemical reactions take place. Such heating means include free flames, furnaces, water, oil, steam, sand and metal baths, immersed heating coils, electrically heated jackets, plungers and heat developed by the absorption of electro-magnetic waves, for example high frequency currents and infra-red radiation.

However, the aforesaid heating means are all associated with certain drawbacks. For example, radiation heating is limited by the absorption capacity of the medium, and requires constant surveillance as well as being expensive.

Baths require cumbersome auxiliary vessels, and are limited in temperature and heat transfer capacity. Furthermore, oil baths soil the outside of the heated vessel, while steam leaks between the bath and the vessel. In the latter case we are also limited to free steam without pressure.

As regards heating coils and plungers, these means employ a high concentration of energy, are conductive to burning and scorching.

Free flames and furnaces are both brutal and dangerous.

Electrically heated jackets are widely used but are subject to limitations, to all means of heating through the walls of the flask.

All external heating means depend on the heat transfer through the walls of the flask. The most common structural material employed in such flasks is glass, which is a poor conductor of heat and which is of necessity thick for structural reasons. As a result, the walls of the vessel must be heated higher than the temperature actually needed inside the vessel to insure heat transfer through the walls. If the heat capacity of the contents of the vessel diminishes very much, the inside wall temperature reaches a dangerous level.

One way of getting around the above disadvantage is the employment of limited temperature baths. However, such baths have a lower heat transfer rate with the resulting slow down in reaction.

On an industrial scale, metallic vessels are employed for structural reasons and are provided with a thin glass coating to resist corrosion. This relatively thin coating does not affect the heat conductivity of the vessel to any material extent. These industrial vessels employ steam wherever possible at varying degrees of temperature and pressure, steam being safe, flexible and an efficient source of heat. Such steam is, of course, confined to the heating coils or jackets, which latter have a relatively high heat conductance.

It is accordingly a principal object of the present invention to bring to the user of common glass reaction vessels all the advantages connected with the use of steam under pressure as a heating means and in addition, all the advantages connected with metal or mostly metallic vessel walls as the heat transfer medium, while still retaining glass walls as the major portion of the reaction vessel structure.

In brief, the present invention proposes to cut away a portion of the glass vessel and to replace it by a metallic or glass-coated metallic insert of the proper shape or form embodying a jacket to permit the use of steam or other fluids for heat transfer, such metallic structure insuring sufficient strength and adequate conductivity for the use of fluids.

Other objects of the present invention are to provide a chemical apparatus bearing the above objects in mind which is of simple construction, has a minimum number of parts, is inexpensive to manufacture, is easy to use and efficient in operation.

For other objects and a better understanding of the invention, reference may be had to the following detailed description taken in connection with the accompanying drawing, in which:

Figure 1 is a perspective view of a chemical apparatus embodying the features of the present invention, shown partly broken away to show the interior construction thereof;

Fig. 2 is a fragmentary vertical sectional view taken along the line 2—2 of Fig. 1; and Fig. 3 is a view similar to Fig. 2 showing a modified form of the present invention.

Referring now more in detail to the drawing, in which similar reference numerals identify corresponding parts throughout the several views, there is shown a chemical apparatus, referred to collectively as 10, and including a double necked glass spherical flask 11, substantially as illustrated.

In the practice of the present invention, the bottom of the flask 11 is provided with a circular opening in which a downwardly extending cylindrical neck 12 is integrally formed, this neck at its lower edge being open and provided with a laterally extending, circular flange 13.

A funnel-shaped heating jacket, referred to collectively as 14, is provided and includes a funnel-shaped metallic inner wall 15 integrally formed around its upper open end with a laterally extending flange 16, adapted to coincide with the undersurface of flange 13 of flask 11.

The bottom of funnel-shaped inner wall 15 terminates in the usual narrow neck 17. The inner wall 15, as well as the flange 16 and neck 17 on the inner surfaces thereof are preferably coated with a continuous layer of thin glass 18, as shown in Fig. 2. This coating serves to protect the inner wall 15, flange 16 and neck 17 from corrosive action of the chemicals poured into the vessel 11, through neck 19.

The inner wall 18 is integrally formed on the outer surface thereof with a freely spaced metallic jacket 20 having an inlet 21 and an outlet 22. Thus, heating fluids entering inlet 21 will circulate between inner wall and jacket 20 and escape through outlet 22. It will be noted that the heating jacket 14 thus described is adapted to handle steam under pressure as a heating medium and is constructed almost entirely of metal with the accompanying structural advantages and high heat conductors.

The heating jacket 14 is connected to flask 11 by means of clamps 23 embracing coincided flanges 13 and 16 as shown in Fig. 1.

Heavy rubber tubing 24 is connected at one end to a suitable source of steam under pressure, not shown, and at the other end to the inlet 21, supplying said steam to jacket 14, the steam escaping through heavy tubing 25 connected at one end to outlet 22 and emptying into a sink or the like at the other end.

A control rod 26 extends downwardly into the vessel 11 through the other neck 27 thereof and fixedly carries a rubber stopper 28 at its lower end adapted to close the neck 17, as will be obvious. Thus, by twisting and pulling the rod 26 upwardly, the bottom outlet stopper 28 will be removed from neck 17 permitting the reacted contents to be emptied from flask 11 through neck 17.

The vessel or flask 11 will be filled through neck 19 with the bottom outlet stopper 28 in the closed position. The steam will then be turned on and passed into heating jacket 14 to supply the necessary heat to the contents of vessel 11. It will be noted that the steam under pressure which passes intermediate jacket 20 and inner wall 15 is transferred to the contents of the vessel 11 directly, the heat transfer medium consisting solely of the inner wall 15 and glass coating 18. Thus, it is unnecessary for the thermal energy to be transferred through the relatively thick walls of vessel 11, which are of glass, having a relatively low heat conductivity. It will also be noted that the integral structure of inner wall 15 with jacket 20 permits steam under pressure to be safely used without escaping.

Thus, there is provided to the user of common glass vessels all the advantages connected with the use of steam under pressure as a heating medium as well as the advantages of metal or mostly metallic vessel walls as a heat transfer medium, while still retaining glass walls as the major portion of the chemical apparatus structure.

It will be obvious that various means of fastening the vessel 11 to the jacket 14 may, of course, be utilized. Also, while in the drawing a spherical glass vessel 11 has been shown, it will be readily understood that the invention is equally applicable to any shape or type of apparatus in which a chemical reaction occurs, requiring heat transfer, i. e., heating or cooling.

It will also be understood that while in the drawing and description thereof reference has been made to steam as a heating medium, the invention is equally applicable to other fluids including the case where heat is withdrawn from the vessel.

It will be appreciated that the present invention is therefore not limited to round glass vessels but is equally applicable to any reaction vessels or apparatus.

Referring now to Fig. 3, there is shown a modified form of the present invention referred to collectively as 29, and including a spherical glass vessel 30, substantially as illustrated.

The vessel 30 at the bottom thereof is provided with an opening 31 in which is secured a complementary shaped plate 32 of metal by means of a glass to metal weld, as at 33. The inner surface of the concave plate 32 is preferably coated with a thin layer of glass 34 to prevent corrosion of the plate 32. The outer surface of plate 32 is integrally formed with a freely spaced jacket 34' of similar shape and having an inlet 35 and an outlet 36. Thus, the heating medium will enter inlet 35 under pressure and escape from outlet 36 in a manner similar to the first form of the invention. The heat will then be transferred through the metal wall 32 in a relatively thin glass coating 34 thereof, with the same advantages as in the first form.

It will be noted that in this form of the invention no bottom outlet for the contents of the flask is provided.

While various changes may be made in the detail construction, it shall be understood that such changes shall be within the spirit and scope of the present invention as defined by the appended claims:

What I claim is:

1. An apparatus for reactive chemicals requiring heat transfer comprising a substantially spherical glass vessel adapted to receive the chemicals, said vessel at the bottom thereof having a relatively large, substantially circular opening, a laterally extending, substantially circular flange integrally formed in the bottom of said vessel around said opening, a substantially funnel-shaped metallic member adapted to be positioned in and close said opening, a laterally extending, substantially circular flange integrally formed in the mouth of said funnel-shaped member adapted to coincide with said flange in said vessel, means for securing said flanges together, a jacket freely and unobstructably spaced from and connected to the outer surface of said funnel-shaped member, adapted to circulate a heat transfer fluid around the outside of said funnel-shaped member, said jacket having an inlet and an outlet, means for supplying heat transfer fluid to said inlet, said vessel having an open neck, said funnel-shaped member including an open neck, a bottom outlet stopper within said neck, an elongated rod connected at its lower end to said stopper and extending upwardly through the open neck of said vessel, said funnel-shaped member being coated with a thin layer of glass.

2. An apparatus for reacting chemicals requiring heat transfer comprising a substantially spherical glass vessel, said vessel at the bottom thereof having a relatively large, substantially circular opening, a laterally extending, substantially circular flange integrally formed at the bottom of said vessel around said opening, a substantially funnel-shaped metallic member having a mouth adapted to close said opening and a downwardly extending open neck, a laterally extending substantially circular flange integrally formed in the mouth of said funnel-shaped member and adapted to coincide with said vessel flange, means for securing said flanges in said coincided position, said funnel-shaped member and said flange and neck thereof on their inner surfaces having a thin coating of glass, a substantially frusto-conical wall freely and unobstructably spaced from and surrounding the outside of said funnel-shaped member, said frusto-conical member at the top and bottom thereof being connected to the outside of said funnel-shaped member and being adapted to receive a heat transfer fluid for circulation around the outside of said funnel shaped member, said frusto-conical member having an inlet and an outlet, means for supplying steam to said inlet, means for conducting the heat transfer fluid away from said outlet, said vessel having an open neck at the top thereof, a bottom stopper adapted to close the open neck of said funnel-shaped member, an elongated rod connected at its bottom end to said stopper and extending upwardly through the open neck of said vessel, said funnel-shaped member being coated with a thin layer of glass on the inner faces thereof.

3. An apparatus according to claim 2, said frusto-conical member being integrally connected to the outer surface of said funnel shaped member.

References Cited in the file of this patent

UNITED STATES PATENTS

| 468,647 | Fehr | Feb. 9, 1892 |
| 514,426 | Outerbridge | Feb. 6, 1894 |
| 669,862 | Shimer | Mar. 12, 1901 |
| 789,793 | Buschemeyer | May 16, 1905 |
| 1,146,014 | Mewborne | July 13, 1915 |
| 1,614,107 | Cleary | Jan. 11, 1927 |
| 2,357,727 | Craig | Sept. 5, 1944 |
| 2,411,006 | Sharp | Nov. 12, 1946 |
| 2,494,719 | Rabjohn | Jan. 17, 1950 |

FOREIGN PATENTS

| 713,986 | France | Nov. 5, 1931 |

OTHER REFERENCES

Fisher: "Modern Laboratory Appliances," copyright 1942, page 569, item 11–502.